US012548885B2

(12) United States Patent
Guan et al.

(10) Patent No.: US 12,548,885 B2
(45) Date of Patent: Feb. 10, 2026

(54) Wi-Fi AND BLUETOOTH COMBINED ANTENNA APPARATUS AND CONFIGURATION METHOD THEREFOR, AND TERMINAL DEVICE

(71) Applicant: HONOR DEVICE CO., LTD., Shenzhen (CN)

(72) Inventors: Qiao Guan, Shenzhen (CN); Yi Wang, Shenzhen (CN); Kunpeng Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 218 days.

(21) Appl. No.: 18/279,301

(22) PCT Filed: Aug. 23, 2022

(86) PCT No.: PCT/CN2022/114297
§ 371 (c)(1),
(2) Date: Aug. 29, 2023

(87) PCT Pub. No.: WO2023/040605
PCT Pub. Date: Mar. 23, 2023

(65) Prior Publication Data
US 2024/0145902 A1 May 2, 2024

(30) Foreign Application Priority Data
Sep. 17, 2021 (CN) ......................... 202111091425.4

(51) Int. Cl.
*H01Q 1/24* (2006.01)
*H01Q 1/36* (2006.01)
(Continued)

(52) U.S. Cl.
CPC ............... *H01Q 1/243* (2013.01); *H01Q 1/36* (2013.01); *H01Q 1/48* (2013.01); *H01Q 21/28* (2013.01)

(58) Field of Classification Search
CPC ............ H01Q 1/243; H01Q 1/36; H01Q 1/48; H01Q 21/28
See application file for complete search history.

(56) References Cited

U.S. PATENT DOCUMENTS 10,418,701 B2 9/2019 Izawa
11,588,244 B2 2/2023 Chan et al.
(Continued)

FOREIGN PATENT DOCUMENTS

CN 103326122 A 9/2013
CN 108140940 A 6/2018
(Continued)

OTHER PUBLICATIONS

D. Moongilan, "Image and return current modeling of PCB traces for radiated emissions," 2001 IEEE EMC International Symposium. Symposium Record. International Symposium on Electromagnetic Compatibility (Cat. No. 01CH37161), Montreal, QC, Canada, 2001, pp. 927-932 vol.2, 6 total pages.
(Continued)

*Primary Examiner* — Graham P Smith
(74) *Attorney, Agent, or Firm* — WOMBLE BOND DICKINSON (US) LLP

(57) ABSTRACT

A Wi-Fi and Bluetooth combined antenna apparatus and a configuration method therefor, and a terminal device. The Wi-Fi and Bluetooth combined antenna apparatus includes a Wi-Fi antenna, a ground plate, a perturbation unit, and a Bluetooth antenna. The Wi-Fi antenna generates a ground plate current on the ground plate; the perturbation unit is configured to generate a reverse current after being excited
(Continued)

by the ground plate current, and a current zero point area is formed on the ground plate after the reverse current is superimposed with the ground plate current; and the Bluetooth antenna is disposed at a position of an edge of the ground plate corresponding to the current zero point area. In this way, isolation between the Bluetooth antenna and the Wi-Fi antenna is better improved.

19 Claims, 14 Drawing Sheets

(51) Int. Cl.
*H01Q 1/48* (2006.01)
*H01Q 21/28* (2006.01)

(56) References Cited

U.S. PATENT DOCUMENTS

| | | | |
|---|---|---|---|
| 2006/0181468 | A1 | 8/2006 | Yuki et al. |
| 2008/0007468 | A1 | 1/2008 | Sato et al. |
| 2009/0027286 | A1 | 1/2009 | Ohishi et al. |
| 2016/0301145 | A1 | 10/2016 | Lee et al. |
| 2019/0252770 | A1 | 8/2019 | Thakur |

FOREIGN PATENT DOCUMENTS

| | | | |
|---|---|---|---|
| CN | 110829026 | A | 2/2020 |
| CN | 111129752 | A | 5/2020 |
| CN | 211017410 | U | 7/2020 |
| CN | 111653873 | A | 9/2020 |
| CN | 113851836 | A | 12/2021 |
| JP | 2006229528 | A | 8/2006 |
| KR | 20100122803 | A | 11/2010 |

OTHER PUBLICATIONS

X. Zhao, S. P. Yeo and L. C. Ong, "Decoupling of Inverted-F Antennas With High-Order Modes of Ground Plane for 5G Mobile MIMO Platform," in IEEE Transactions on Antennas and Propagation, vol. 66, No. 9, Sep. 2018, pp. 4485-4495.

Wi-Fi AND BLUETOOTH COMBINED ANTENNA APPARATUS AND CONFIGURATION METHOD THEREFOR, AND TERMINAL DEVICE

CROSS-REFERENCE TO RELATED APPLICATIONS

This application is a national stage of International Application No. PCT/CN2022/114297 filed on Aug. 23, 2022, which claims priority to Chinese Patent Application No. 202111091425.4 filed on Sep. 17, 2021. The disclosures of both of the aforementioned application are hereby incorporated by reference in their entireties.

TECHNICAL FIELD

This application belongs to the field of communication technologies, and in particular, relates to a Wi-Fi and Bluetooth combined antenna apparatus and a configuration method therefor, and a terminal device.

BACKGROUND

An existing terminal device such as a tablet or a mobile phone is often equipped with a Wi-Fi antenna and a Bluetooth antenna. However, the Wi-Fi antenna and the Bluetooth antenna generally work in a same frequency band, and when a Wi-Fi module and a Bluetooth module share an antenna, it is a time division strategy, which leads to a sharp decline in performance of the Wi-Fi module when the Bluetooth module works.

SUMMARY

An objective of embodiments of this application is to provide a Wi-Fi and Bluetooth combined antenna apparatus and a configuration method therefor, and a terminal device, which can improve isolation between a Wi-Fi antenna and a Bluetooth antenna, so that the Bluetooth antenna and the Wi-Fi antenna have better working performance when simultaneously working in a same frequency band.

To achieve the foregoing objective, technical solutions used in this application are as follows.

According to a first aspect, a Wi-Fi and Bluetooth combined antenna apparatus is provided, including:

- a Wi-Fi antenna;
- a ground plate, where the Wi-Fi antenna is disposed at an edge of the ground plate and can generate a ground plate current on the ground plate;
- a perturbation unit, where the perturbation unit is disposed at an edge of the ground plate and is configured to generate a reverse current whose direction is opposite to an incoming wave direction of the ground plate current after being excited by the ground plate current, and a current zero point area is formed on the ground plate after the reverse current is superimposed with the ground plate current; and
- a Bluetooth antenna, where the Bluetooth antenna is disposed at a position of the edge of the ground plate corresponding to the current zero point area.

In this way, the Wi-Fi and Bluetooth combined antenna apparatus includes the perturbation unit, and when the Wi-Fi antenna generates the ground plate current on the ground plate, the perturbation unit can generate the reverse current whose direction is opposite to the incoming wave direction of the ground plate current after being excited by the ground plate current, so that the reverse current is superimposed with the ground plate current and the current zero point area can be formed on the ground plate, and then the Bluetooth antenna is disposed at a position of the edge of the ground plate corresponding to the current zero point area, which better reduces an impact of the ground plate current on the Bluetooth antenna, better improves isolation between the Bluetooth antenna and the Wi-Fi antenna, and better implements decoupling when the Bluetooth antenna and the Wi-Fi antenna simultaneously work in a same working frequency band, so that the Bluetooth antenna and the Wi-Fi antenna have better working performance when simultaneously working in a same frequency band.

Optionally, the Wi-Fi antenna and the perturbation unit are respectively disposed at two opposite corner positions of the ground plate. Exemplarily, the Wi-Fi antenna and the perturbation unit may be respectively disposed at two ends of a same side edge of the ground plate. Alternatively, the Wi-Fi antenna and the perturbation unit may be respectively disposed at two adjacent side edges of the ground plate. For example, the Wi-Fi antenna may be placed on a long side of the ground plate, while the perturbation unit may be placed on a short side of the ground plate.

Optionally, there are two perturbation units, the two perturbation units are disposed diagonally at two corner positions of the ground plate relative to a center of the ground plate, and the Wi-Fi antenna is disposed at another corner position of the ground plate. Exemplarily, the two perturbation units may be respectively placed on two opposite long sides of the ground plate, or may be respectively placed on adjacent long and short sides of the ground plate, that is, the two perturbation units may be placed in parallel or orthogonally.

Optionally, resonant frequencies of two perturbation units are the same.

Optionally, resonant frequencies of resonant frequencies of two perturbation units are different, and a difference between the resonant frequencies of resonant frequencies of the two perturbation units is greater than 0 MHz and less than or equal to 100 MHz.

Optionally, the perturbation unit includes a radiator, a connecting portion, and a resistor-capacitor matching network, the radiator is connected to the ground plate through the connecting portion, and the resistor-capacitor matching network is connected to an open end of the radiator and is used for outputting the reverse current to the ground plate. When the resonant frequencies of the two perturbation units are the same, resistor-capacitor matching networks have a same equivalent capacitance (for example, both are 0.3 pF). However, when the resonant frequencies of the two perturbation units are the same, the resistor-capacitor matching networks have different equivalent capacitances (for example, 0.3 pF and 0.35 pF respectively).

Optionally, the connecting portion and the radiator are integrally formed; or the connecting portion is a metal spring plate, one end of the metal spring plate is welded to the radiator, and the other end of the metal spring plate is welded to the ground plate.

Optionally, a length, a thickness, and a clearance of the radiator satisfy the following relationships:

$$10\ \text{mm} \leq L \leq 18\ \text{mm};$$

$$0.8\ \text{mm} \leq C \leq 1.2\ \text{mm};\ \text{and}$$

$$0.8\ \text{mm} \leq D \leq 1.2\ \text{mm},$$

where L represents the length of the radiator, C represents the thickness of the radiator, and D represents the clearance of the radiator.

According to a second aspect, a configuration method for a Wi-Fi and Bluetooth combined antenna apparatus is provided, including the following steps:

providing a Wi-Fi antenna and a ground plate, and disposing the Wi-Fi antenna at an edge of the ground plate;

providing a perturbation unit, and disposing the perturbation unit at an edge of the ground plate, to enable the perturbation unit and the Wi-Fi antenna to be disposed opposite to each other;

obtaining a position of a current zero point area formed on the ground plate after a ground plate current generated on the ground plate by the Wi-Fi antenna is superimposed with a reverse current generated on the ground plate by the perturbation unit; and providing a Bluetooth antenna, and disposing the Bluetooth antenna at a position of the edge of the ground plate corresponding to the current zero point area.

According to the configuration method for the Wi-Fi and Bluetooth combined antenna apparatus provided in this embodiment of this application, the perturbation unit is disposed at the edge of the ground plate, and the perturbation unit and the Wi-Fi antenna are enabled to be disposed opposite to each other, so that when the Wi-Fi antenna generates the ground plate current on the ground plate, the perturbation unit can generate the reverse current whose direction is opposite to an incoming wave direction of the ground plate current after being excited by the ground plate current, so that the reverse current is superimposed with the ground plate current and the current zero point area can be formed on the ground plate, and then the Bluetooth antenna is disposed at the position of the edge of the ground plate corresponding to the current zero point area, which better reduces an impact of the ground plate current on the Bluetooth antenna, better improves isolation between the Bluetooth antenna and the Wi-Fi antenna, and better implements decoupling when the Bluetooth antenna and the Wi-Fi antenna simultaneously work in a same working frequency band, so that the Bluetooth antenna and the Wi-Fi antenna have better working performance when simultaneously working in a same frequency band.

According to a third aspect, a terminal device is provided, including the foregoing Wi-Fi and Bluetooth combined antenna apparatus.

The terminal device provided in this embodiment of this application includes the foregoing Wi-Fi and Bluetooth combined antenna apparatus, and the foregoing Wi-Fi and Bluetooth combined antenna apparatus implements, through a perturbation unit disposed therein, decoupling when a Bluetooth antenna and a Wi-Fi antenna simultaneously work in a same working frequency band, so that the Bluetooth antenna and the Wi-Fi antenna have better isolation and can have better working performance when simultaneously working in a same frequency band. In this way, when the terminal device is connected to a Wi-Fi network and is simultaneously connected to an external device by using the Bluetooth antenna, that the Bluetooth antenna and the Wi-Fi antenna do not affect each other can also be satisfied, so that a user of the terminal device has better user product experience.

BRIEF DESCRIPTION OF DRAWINGS

To describe the technical solutions in the embodiments of this application, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

REFERENCE NUMERALS IN THE ACCOMPANYING DRAWINGS

Figure 1:
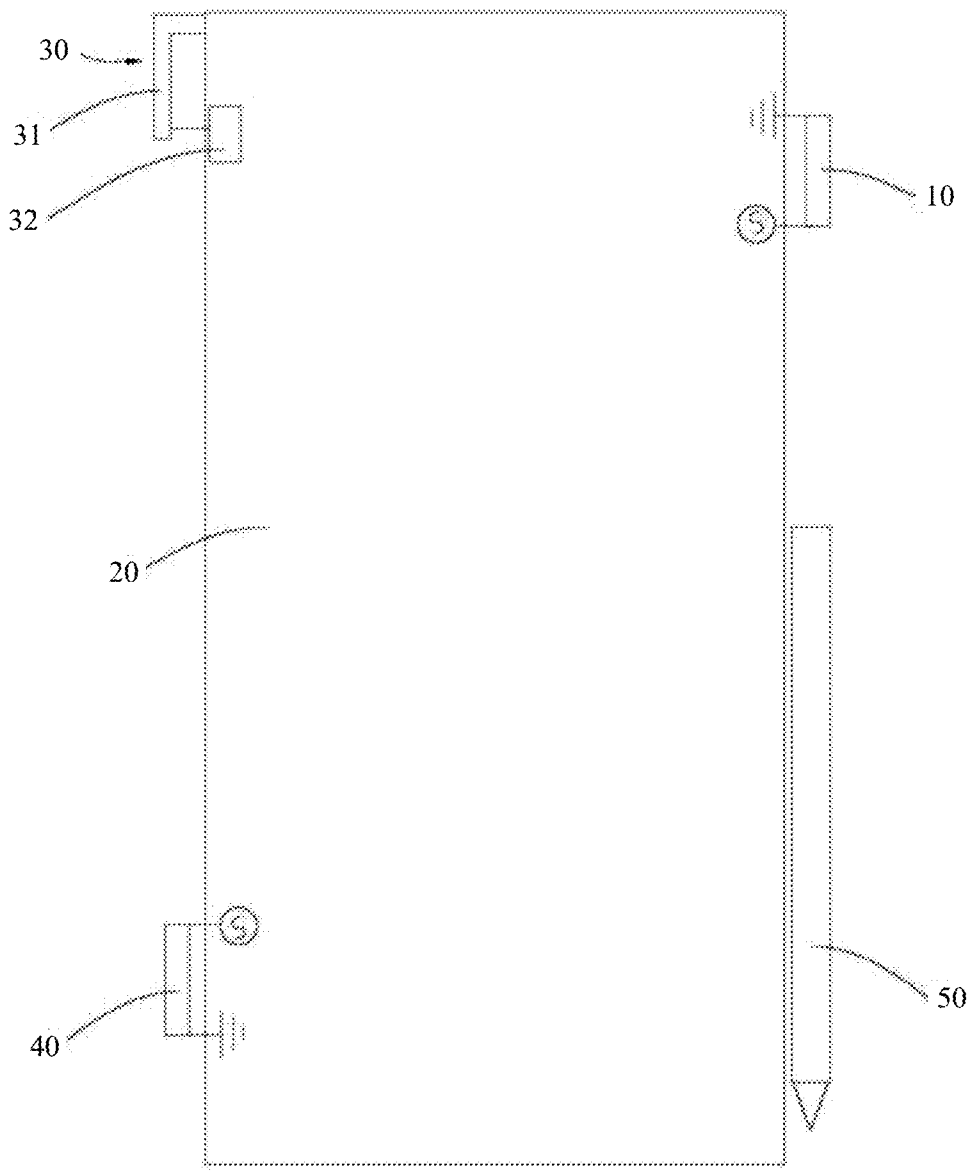
FIG. 1 is a schematic structural diagram 1 of a Wi-Fi and Bluetooth combined antenna apparatus according to an embodiment of this application.

10: Wi-Fi antenna; 20: Ground plate; 30: Perturbation unit;

40: Bluetooth antenna; 50: Stylus; 31: Radiator;

32: Resistor-capacitor matching network; and 33: Connecting portion.

DESCRIPTION OF EMBODIMENTS

The embodiments of this application are described in detail below, examples of the embodiments are shown in the accompanying drawings, where same or similar elements or elements having same or similar functions are denoted by same or similar reference numerals throughout the description. The following embodiments described with reference to FIG. 1 to FIG. 15 are exemplary, which are intended to interpret this application and cannot be construed as limiting this application.

In the description of this application, it should be understood that orientation or position relationships indicated by the terms such as "length", "width", "upper", "lower", "front", "rear", "left", "right", "vertical", "horizontal", "top", "bottom", "inside", and "outside" are based on orientations or position relationships shown in the accompanying drawings, and are used merely for ease of describing this application and simplifying the description, instead of indicating or implying that the mentioned apparatus or element must have a particular orientation or must be constructed and operated in a particular orientation, and therefore cannot be construed as limiting this application.

In addition, the terms "first" and "second" are used merely for the purpose of description, and shall not be construed as indicating or implying relative importance or implying a quantity of indicated technical features. Therefore, a feature defining "first" or "second" may explicitly or implicitly include one or more of the feature. In the description of this application, unless otherwise specifically defined, "a plurality of" means two or more than two.

In this application, unless otherwise explicitly specified or defined, the terms "mounted", "connected", "connection", "fixed" and the like are to be understood broadly. For example, the connection may be a fixed connection, a detachable connection, or an integral connection; or the connection may be a mechanical connection or an electrical connection; or the connection may be a direct connection, an indirect connection through an intermediate medium, or internal communication between two elements or an interaction relationship between two elements. A person of ordinary skill in the art may understand specific meanings of the foregoing terms in this application according to a specific situation.

The following further explains proper terms that appear in the embodiments of this application.

Wi-Fi, translated into Chinese as mobile hotspot or wireless network, is a wireless local area network technology created in accordance with the IEEE 802.11 standard.

Bluetooth (BT, Bluetooth) is a global specification for the openness of wireless data and voice communication, which is based on a low-cost close-range wireless connection, and is a special close-range wireless technology connection for establishing a communication environment for a stationary device and a mobile device.

Isolation, where a coupling loss between transceiver antennas of different systems is greater than a minimum threshold for generating interference between the systems, and the coupling loss is the isolation.

An existing terminal device such as a tablet or a mobile phone is often equipped with a Wi-Fi antenna and a Bluetooth antenna. However, the Wi-Fi antenna and the Bluetooth antenna generally work in a same frequency band, and when a Wi-Fi module and a Bluetooth module share an antenna, it is a time division strategy, which leads to a sharp decline in performance of the Wi-Fi module when the Bluetooth module works.

Therefore, the embodiments of this application provide a Wi-Fi and Bluetooth combined antenna apparatus, a configuration method therefor, and a terminal device, which can improve isolation between the Wi-Fi antenna and the Bluetooth antenna, so that the Bluetooth antenna and the Wi-Fi antenna have better working performance when simultaneously working in a same frequency band.

In the embodiments, the terminal device may be a tablet computer, a notebook computer, a mobile phone, or the like.

Figure 2:
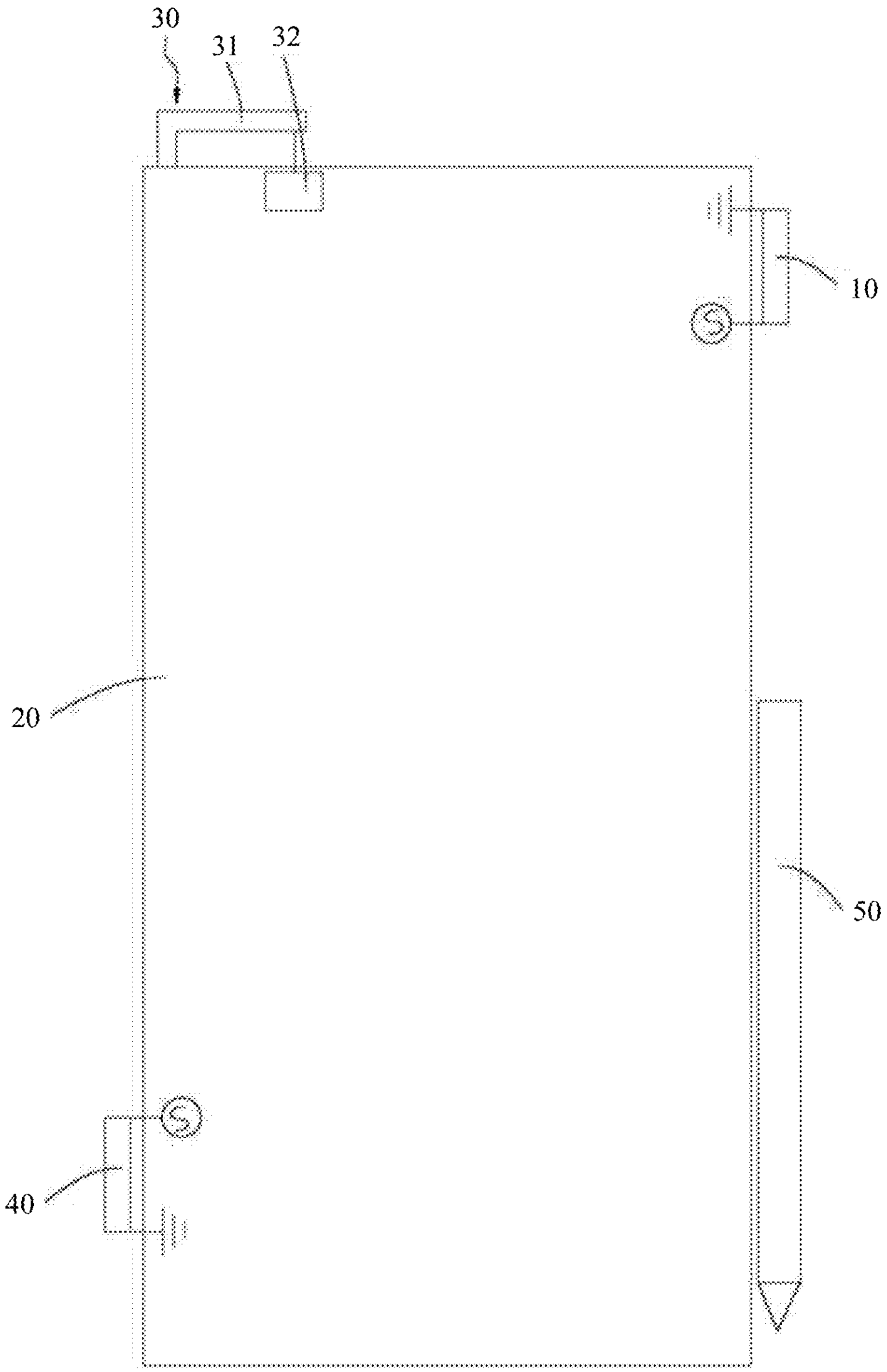
FIG. 2 is a schematic structural diagram 2 of a Wi-Fi and Bluetooth combined antenna apparatus according to an embodiment of this application.
Figure 3:
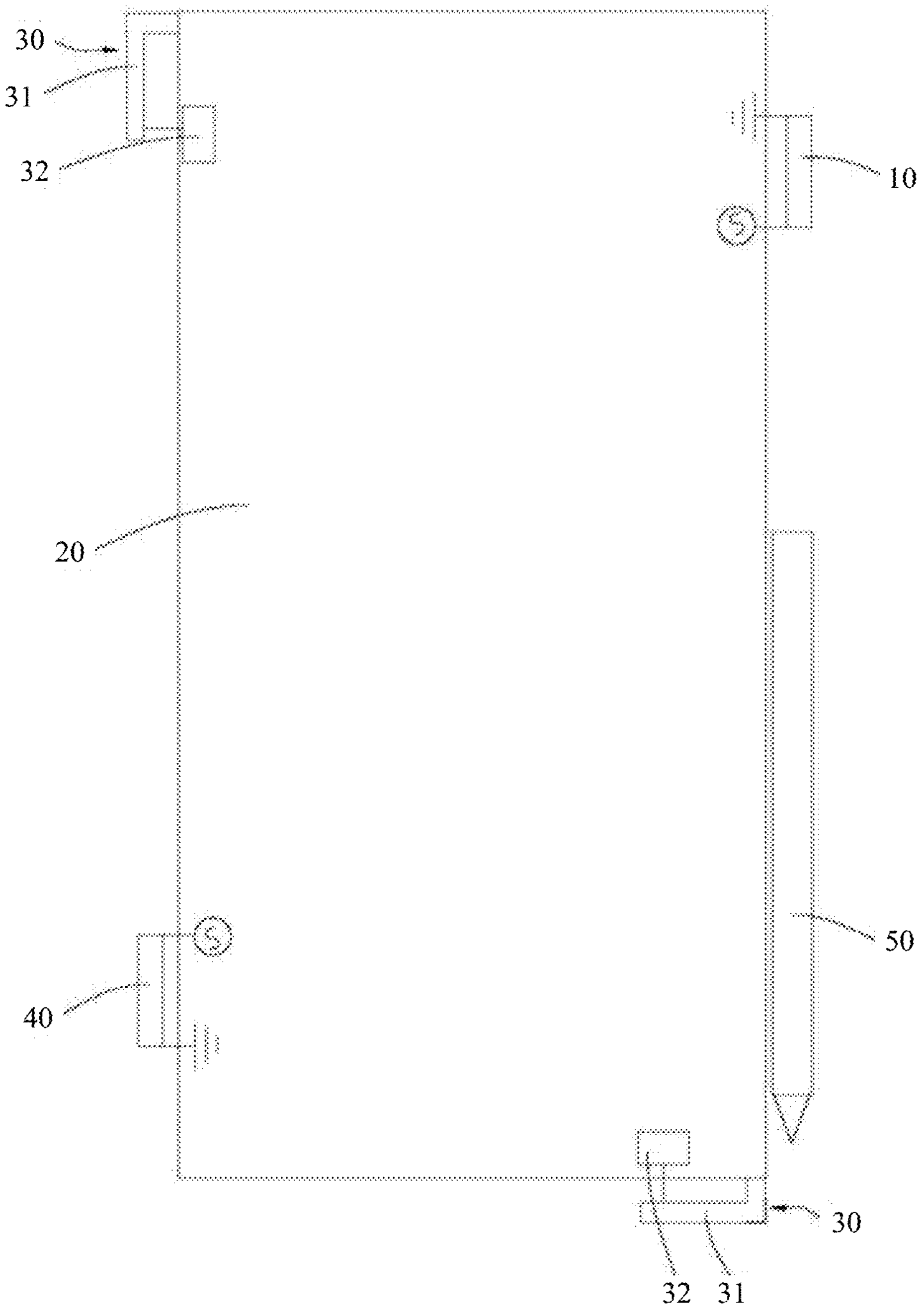
FIG. 3 is a schematic structural diagram 3 of a Wi-Fi and Bluetooth combined antenna apparatus according to an embodiment of this application.

According to a first aspect, referring to FIG. 1 to FIG. 3, an embodiment of this application provides a Wi-Fi and Bluetooth combined antenna apparatus, which includes a Wi-Fi antenna 10, a ground plate 20, a perturbation unit 30, and a Bluetooth antenna 40. The Wi-Fi antenna 10 is disposed at an edge of the ground plate 20 and can generate a ground plate 20 current on the ground plate 20. The perturbation unit 30 is disposed at an edge of the ground plate 20, and is configured to generate a reverse current whose direction is opposite to an incoming wave direction of the ground plate 20 current after being excited by the ground plate 20 current, and a current zero point area is formed on the ground plate 20 after the reverse current is superimposed with the ground plate 20 current. The Bluetooth antenna 40 is disposed at a position of the edge of the ground plate 20 corresponding to the current zero point area (as shown in a dotted line box in FIG. 6).

Exemplarily, the Wi-Fi antenna 10 may be a left-handed antenna, a length of a radiation body of the Wi-Fi antenna 10 may be 15 mm, a thickness thereof may be 1 mm, and an antenna clearance may be 1 mm.

Exemplarily, a length and width dimension of the ground plate 20 may be 245 mm/155 mm, or may be 155 mm/80 mm, 245 mm/200 mm, or the like.

The Wi-Fi and Bluetooth combined antenna apparatus provided in this embodiment of this application is further described below. According to the Wi-Fi and Bluetooth combined antenna apparatus provided in this embodiment of this application, the Wi-Fi and Bluetooth combined antenna apparatus includes the perturbation unit 30, and when the Wi-Fi antenna 10 generates the ground plate current on the ground plate 20, the perturbation unit 30 can generate the reverse current whose direction is opposite to the incoming wave direction of the ground plate current after being excited by the ground plate current, so that the reverse current is superimposed with the ground plate current and the current zero point area can be formed on the ground plate, and then the Bluetooth antenna 40 is disposed at the position of the edge of the ground plate 20 corresponding to the current zero point area, which better reduces an impact of the ground plate current on the Bluetooth antenna 40, better improves isolation between the Bluetooth antenna 40 and the Wi-Fi antenna 10, and better implements decoupling when the Bluetooth antenna 40 and the Wi-Fi antenna 10 simultaneously work in a same working frequency band, so that the Bluetooth antenna 40 and the Wi-Fi antenna 10 have better working performance when simultaneously working in a same frequency band, and the Wi-Fi and Bluetooth combined antenna apparatus is suitable for a terminal device with a metal back cover.

Figure 7:
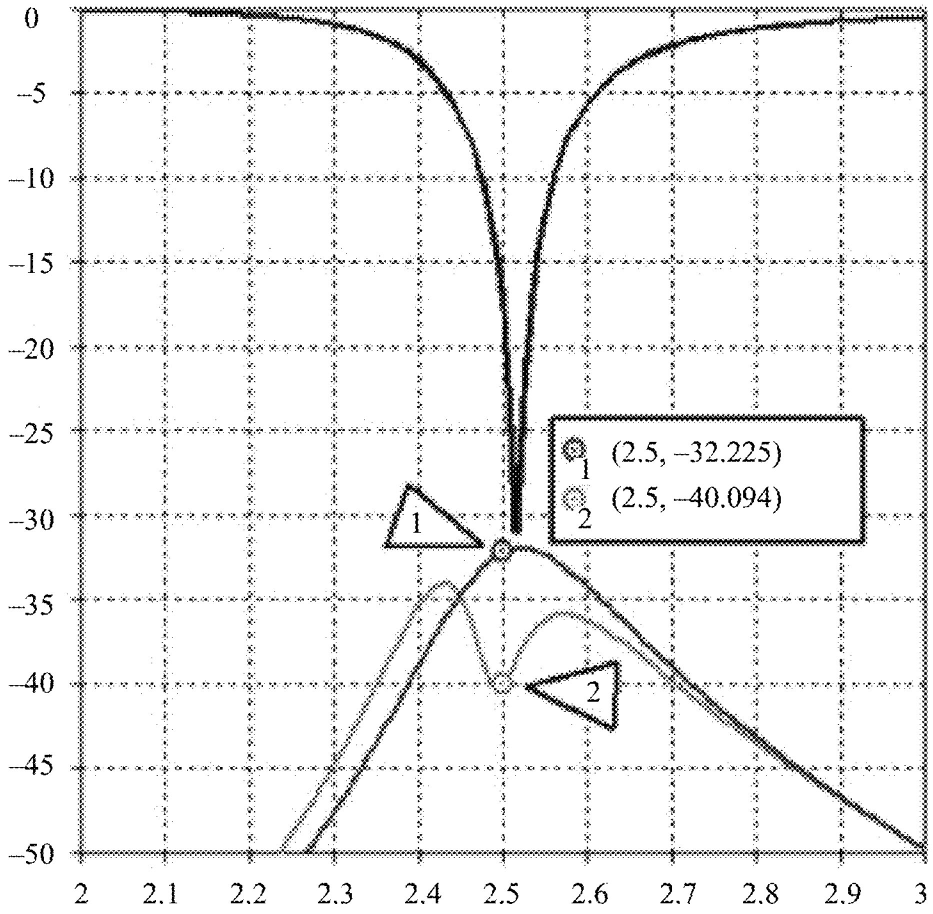
FIG. 7 is a curve graph 1 illustrating an S parameter of a Wi-Fi and Bluetooth combined antenna apparatus changing with a frequency according to an embodiment of this application.
Figure 8:
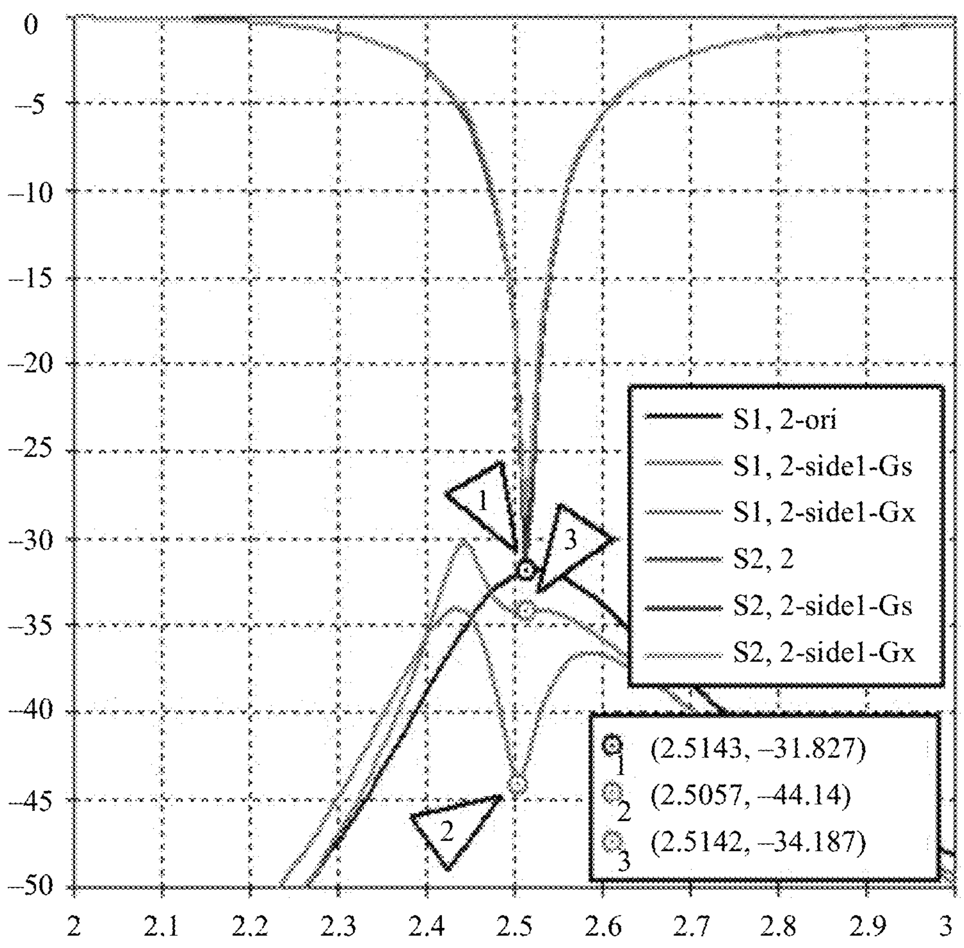
FIG. 8 is a curve graph 2 illustrating an S parameter of a Wi-Fi and Bluetooth combined antenna apparatus changing with a frequency according to an embodiment of this application.

Exemplarily, as shown in FIG. 7 and FIG. 8, comparing a Wi-Fi and Bluetooth combined antenna apparatus to which the perturbation unit 30 is not added and a Wi-Fi and Bluetooth combined antenna apparatus to which the perturbation unit 30 is added (a curve labeled 1 in FIG. 7 represents a curve graph illustrating an S parameter of the Wi-Fi and Bluetooth combined antenna apparatus to which the perturbation unit 30 is not added changing with a frequency, and a curve labeled 2 in FIG. 7 represents a curve graph illustrating an S parameter of the Wi-Fi and Bluetooth combined antenna apparatus to which the perturbation unit 30 is added changing with a frequency), there is no obvious pit in a curve S11 of the Wi-Fi antenna 10, radiation efficiency of the Wi-Fi antenna 10 is not deteriorated significantly, and in a transmission curve S12 of the Wi-Fi antenna 10, an isolation zero point (S12 pit) appears and isolation exceeds 40 dB, which is significantly improved (a peak value of the isolation is increased by 8 dB to 12 dB, and an average value is increased by around 6 dB).

In some other embodiments of this application, as shown in FIG. 1 to FIG. 3, the Wi-Fi antenna 10 and the perturbation unit 30 are respectively disposed at two opposite corner positions of the ground plate 20. Specifically, by respectively disposing the Wi-Fi antenna 10 and the perturbation unit 30 at the two opposite corner positions of the ground plate 20, an impact of the perturbation unit 30 on the Wi-Fi antenna 10 can be reduced, so that the Wi-Fi antenna 10 with the presence of the perturbation unit 30 can also have better working performance such as bandwidth performance, transmission efficiency, transmission directivity, and two-handed mode performance.

Exemplarily, the Wi-Fi antenna 10 and the perturbation unit 30 may be respectively disposed at two ends of a same side edge of the ground plate. Alternatively, the Wi-Fi antenna 10 and the perturbation unit 30 may be respectively disposed at adjacent side edges of the ground plate. For example, the Wi-Fi antenna 10 may be placed on a long side of the ground plate 20, while the perturbation unit 30 can be placed on a short side of the ground plate 20.

Figure 4:
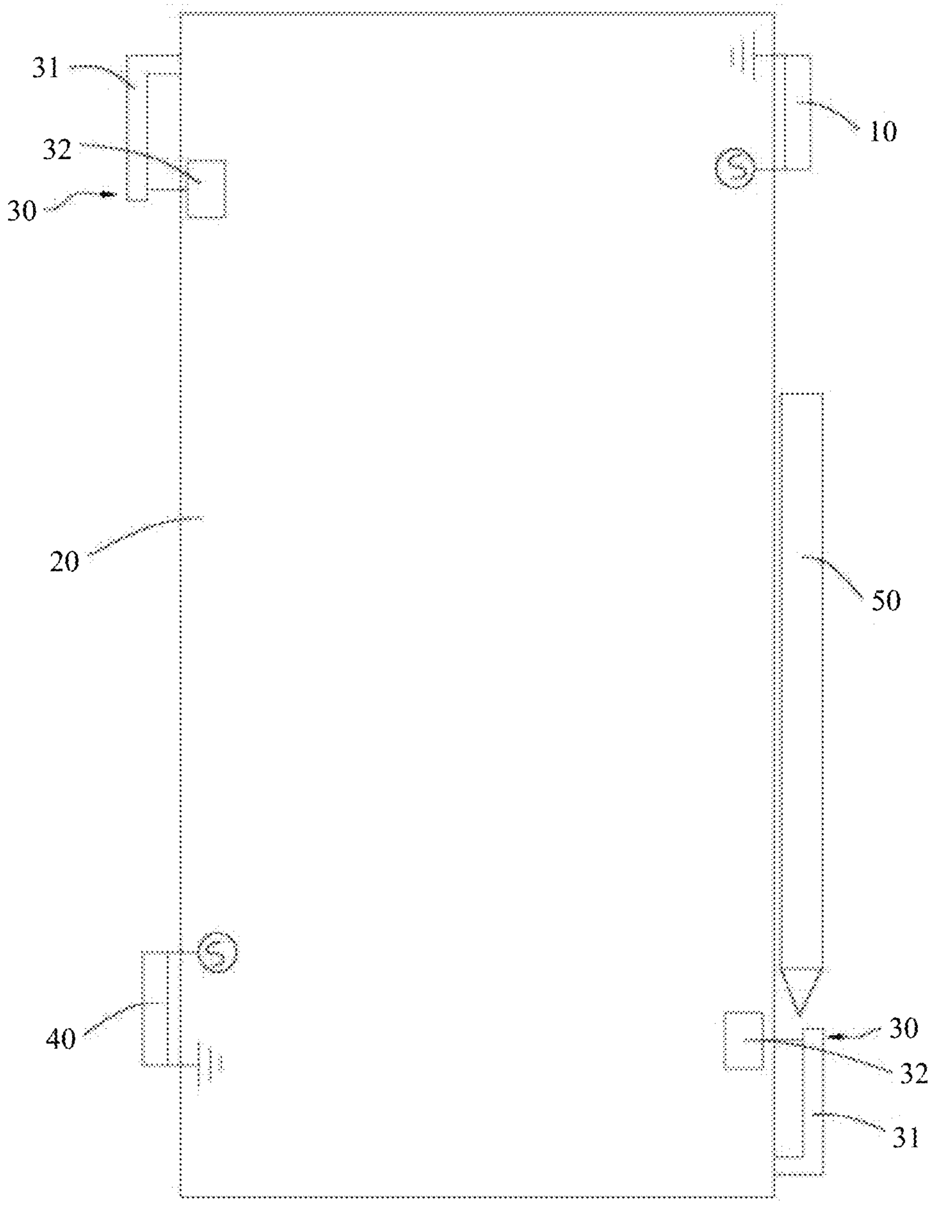
FIG. 4 is a schematic structural diagram 4 of a Wi-Fi and Bluetooth combined antenna apparatus according to an embodiment of this application.

In some other embodiments of this application, as shown in FIG. 3 and FIG. 4, there are two perturbation units 30, the two perturbation units 30 are disposed diagonally at two corner positions of the ground plate 20 relative to a center of the ground plate 20, and the Wi-Fi antenna 10 is disposed at another corner position of the ground plate 20.

Specifically, by setting that there are two perturbation units 30, reverse currents generated by the two perturbation units 30 are superimposed with the ground plate current generated by the Wi-Fi antenna 10, through which the ground plate current generated by the Wi-Fi antenna 10 can be better offset, so that the Bluetooth antenna 40 is less affected by the ground plate current, so that there is better isolation between the Bluetooth antenna 40 and the Wi-Fi antenna 10.

Exemplarily, the two perturbation units 30 may be respectively placed on two opposite long sides of the ground plate 20, or may be respectively placed on adjacent long and short sides of the ground plate 20, that is, the two perturbation units 30 may be placed in parallel or orthogonally.

In some other embodiments of this application, resonant frequencies of the two perturbation units 30 may be the same or different. When the resonant frequencies of the two perturbation units 30 are different, a difference between the resonant frequencies of resonant frequencies of the two perturbation units 30 is greater than 0 MHz and less than or equal to 100 MHz. In this way, the ground plate current generated by the Wi-Fi antenna 10 can be better offset, so that there is better isolation between the Bluetooth antenna 40 and the Wi-Fi antenna 10.

Exemplarily, as shown in FIG. 8, when the two perturbation units 30 are disposed in parallel and the resonant frequencies are the same, the peak value of the isolation is increased by 10 dB (a curve labeled 1 in FIG. 8 represents a curve graph illustrating the S parameter of the Wi-Fi and Bluetooth combined antenna apparatus to which the perturbation unit 30 is not added changing with the frequency, a curve labeled 3 in FIG. 8 represents a curve graph illustrating the S parameter of the Wi-Fi and Bluetooth combined antenna apparatus to which two perturbation units 30 whose resonant frequencies are the same are added changing with the frequency, and a curve labeled 2 in FIG. 8 represents a curve graph illustrating the S parameter of the Wi-Fi and Bluetooth combined antenna apparatus to which two perturbation units 30 whose resonant frequencies are different are added changing with the frequency). When the two perturbation units 30 are disposed in parallel and the resonant frequencies are different, the peak value of the isolation is increased by 23 dB, and the average value is increased by 7 dB.

Exemplarily, as shown in FIG. 8, when the two perturbation units 30 are disposed in parallel and the resonant frequencies are the same, the peak value of the isolation is increased by 10 dB (a curve labeled 1 in FIG. 8 represents a curve graph illustrating the S parameter of the Wi-Fi and Bluetooth combined antenna apparatus to which the perturbation unit 30 is not added changing with the frequency, a curve labeled 3 in FIG. 8 represents a curve graph illustrating the S parameter of the Wi-Fi and Bluetooth combined antenna apparatus to which two perturbation units 30 whose resonant frequencies are the same are added changing with the frequency, and a curve labeled 2 in FIG. 8 represents a curve graph illustrating the S parameter of the Wi-Fi and Bluetooth combined antenna apparatus to which two perturbation units 30 whose resonant frequencies are different are added changing with the frequency). When the two perturbation units 30 are disposed in parallel and the resonant frequencies are different, the peak value of the isolation is increased by 23 dB, and the average value is increased by 7 dB.

Figure 9:
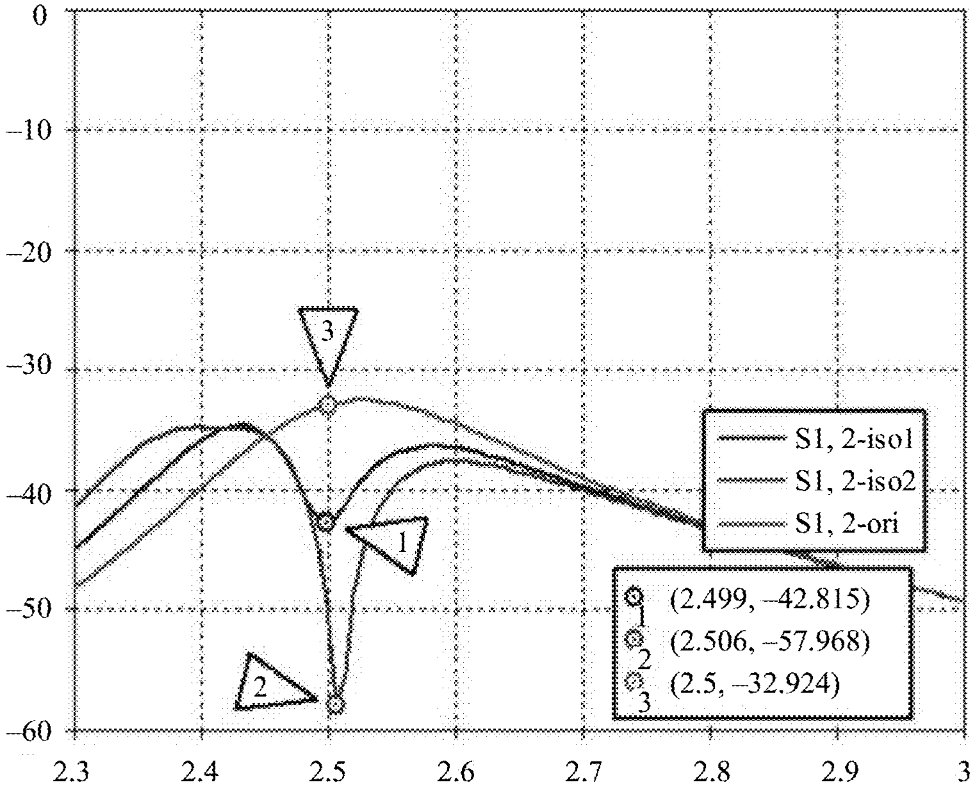
FIG. 9 is a curve graph 3 illustrating an S parameter of a Wi-Fi and Bluetooth combined antenna apparatus changing with a frequency according to an embodiment of this application.

Exemplarily, as shown in FIG. 9, when the two perturbation units 30 are orthogonally disposed and the resonant frequencies are the same, the peak value of the isolation is increased by 8 dB to 12 dB (a curve labeled 1 in FIG. 9 represents a curve graph illustrating the S parameter of the Wi-Fi and Bluetooth combined antenna apparatus to which the perturbation unit 30 is not added changing with the frequency, a curve labeled 3 in FIG. 9 represents a curve graph illustrating the S parameter of the Wi-Fi and Bluetooth combined antenna apparatus to which two perturbation units 30 whose resonant frequencies are the same are added changes with the frequency, and a curve labeled 2 in FIG. 9 represents a curve graph illustrating the S parameter of the Wi-Fi and Bluetooth combined antenna apparatus to which two perturbation units 30 whose resonant frequencies are different are added changing with the frequency). When the two perturbation units 30 are orthogonally disposed and the resonant frequencies are different, the peak value of the isolation is increased by 19 dB to 24 dB, and the average value is increased by 5 dB to 7 dB.

Figure 10:
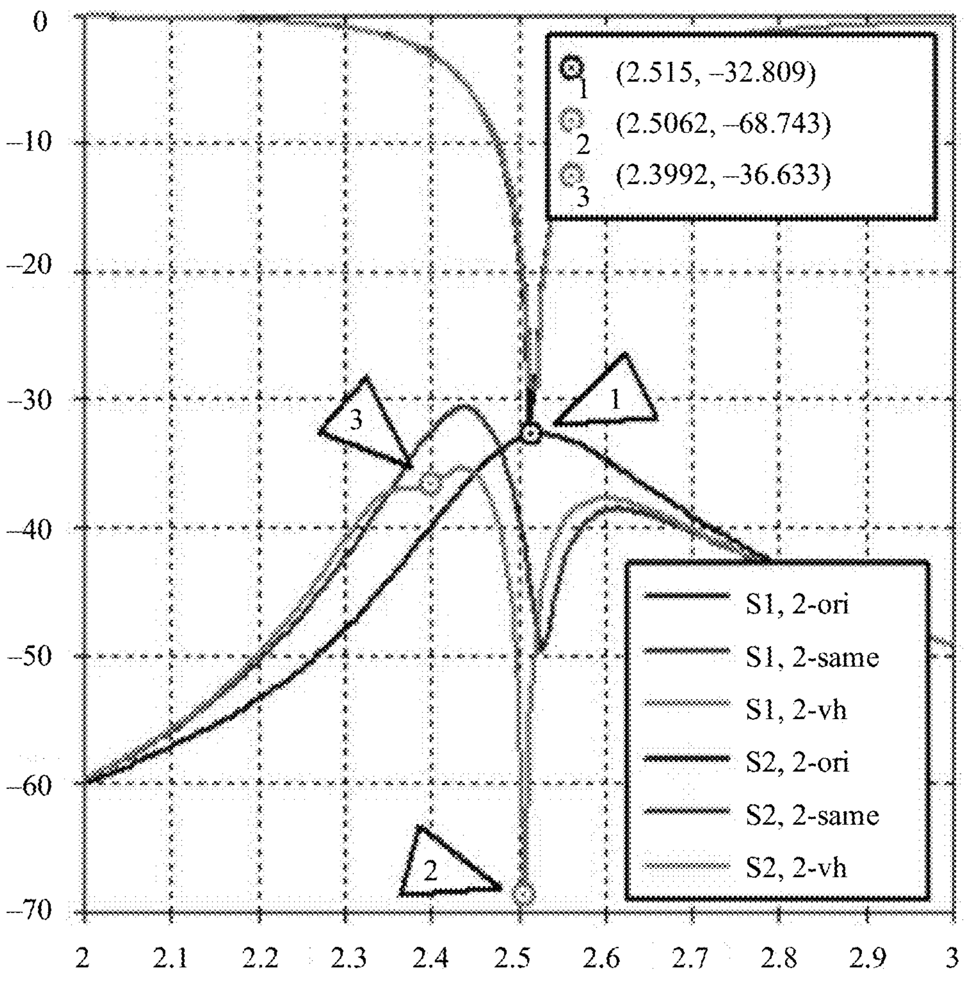
FIG. 10 is a curve graph 4 illustrating an S parameter of a Wi-Fi and Bluetooth combined antenna apparatus changing with a frequency according to an embodiment of this application.

Exemplarily, as shown in FIG. 10, when the two perturbation units 30 are orthogonally disposed and the resonant frequencies are different, the peak value of the isolation is increased by 36 dB and the average value is increased by 10 dB. However, directivity of the Wi-Fi antenna 10 changes only from 3.7 dBi to 3.8 dBi. Therefore, it can be learned that an impact of the presence of the two perturbation units 30 on the Wi-Fi antenna 10 is basically negligible.

Figure 11:
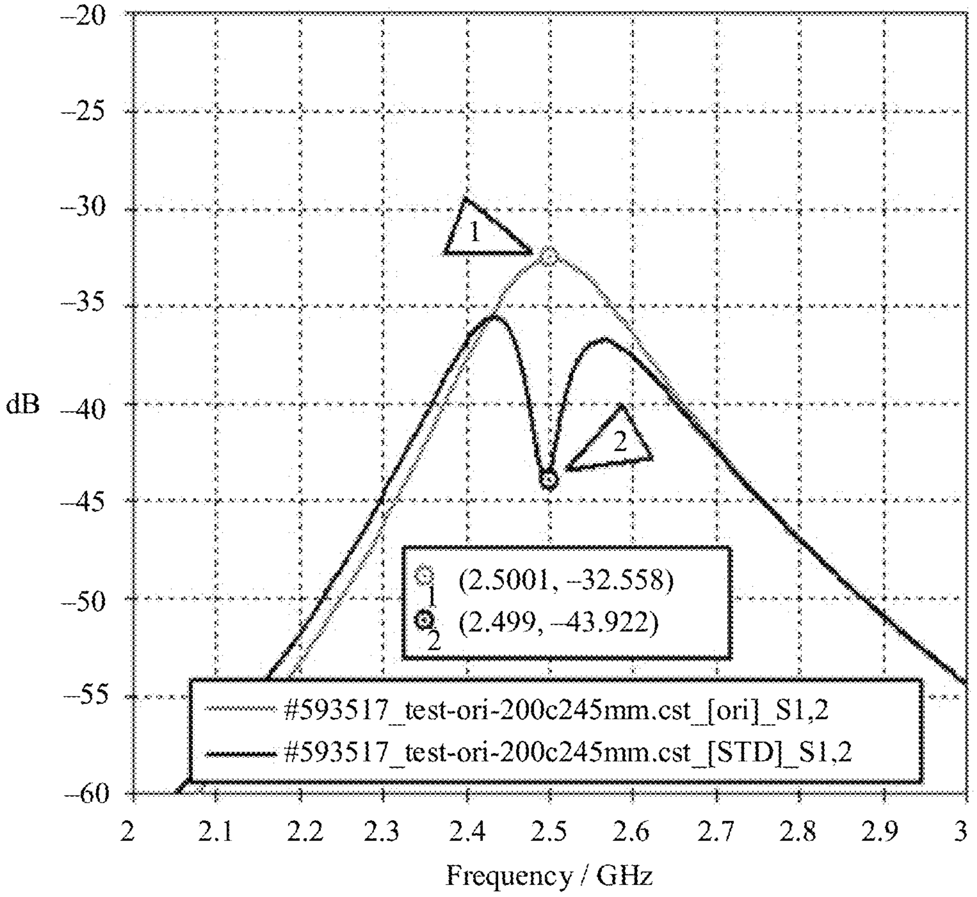
FIG. 11 is a curve graph 5 illustrating an S parameter of a Wi-Fi and Bluetooth combined antenna apparatus changing with a frequency according to an embodiment of this application.
Figure 12:
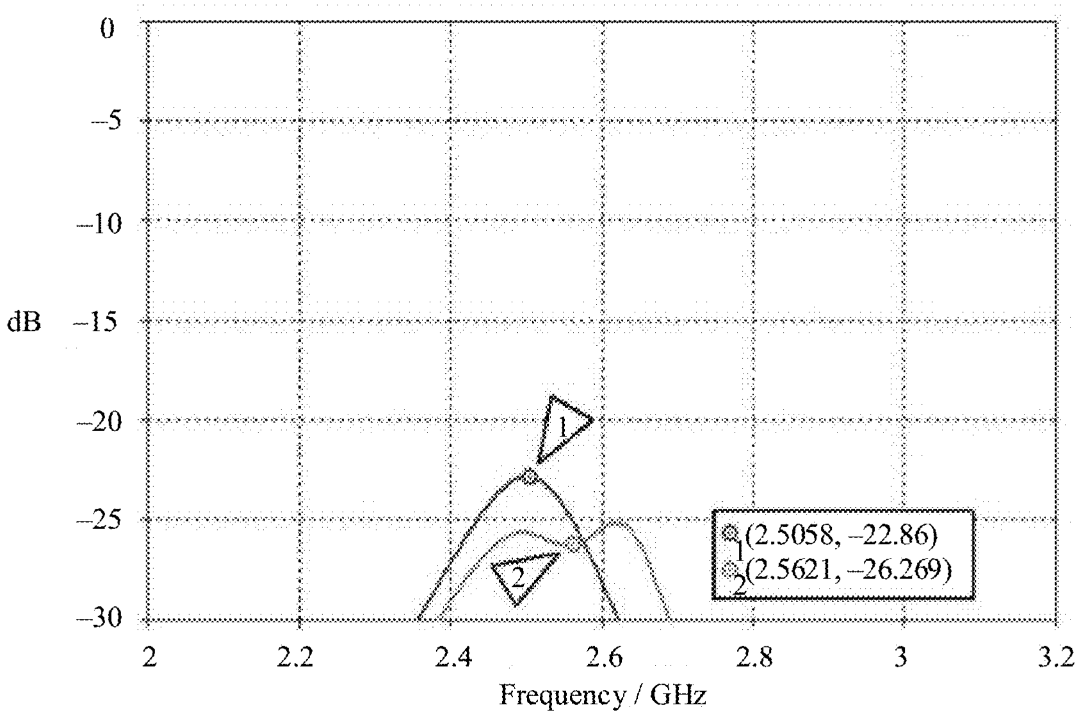
FIG. 12 is a curve graph 6 illustrating an S parameter of a Wi-Fi and Bluetooth combined antenna apparatus changing with a frequency according to an embodiment of this application.

Exemplarily, as shown in FIG. 11 and FIG. 12, when the length and width dimension of the ground plate 20 is 245 mm/200 mm, a result shows that the peak value of the isolation may be increased by 10 dB (as shown in FIG. 11). When the length and width dimension of the ground plate 20 is 155 mm/80 mm, a result shows that an independent Bluetooth is placed at the position of the zero point area formed by the Wi-Fi antenna and the perturbation unit, and the peak value of the isolation may be increased by 3.5 dB (as shown in FIG. 12).

Figure 5:
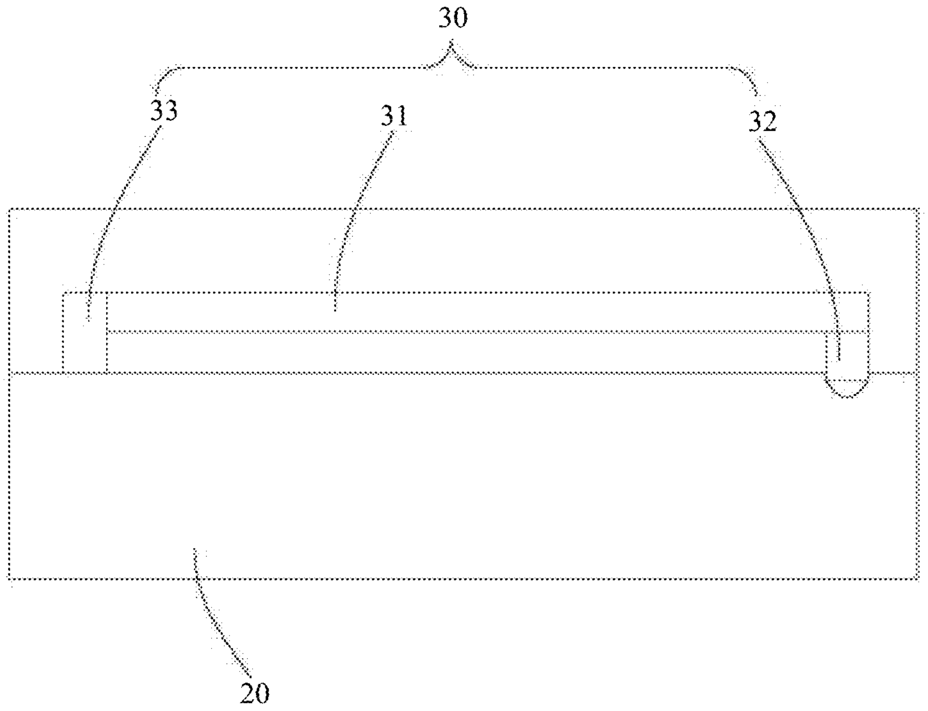
FIG. 5 is a schematic structural diagram of a perturbation unit of a Wi-Fi and Bluetooth combined antenna apparatus according to an embodiment of this application.
Figure 6:
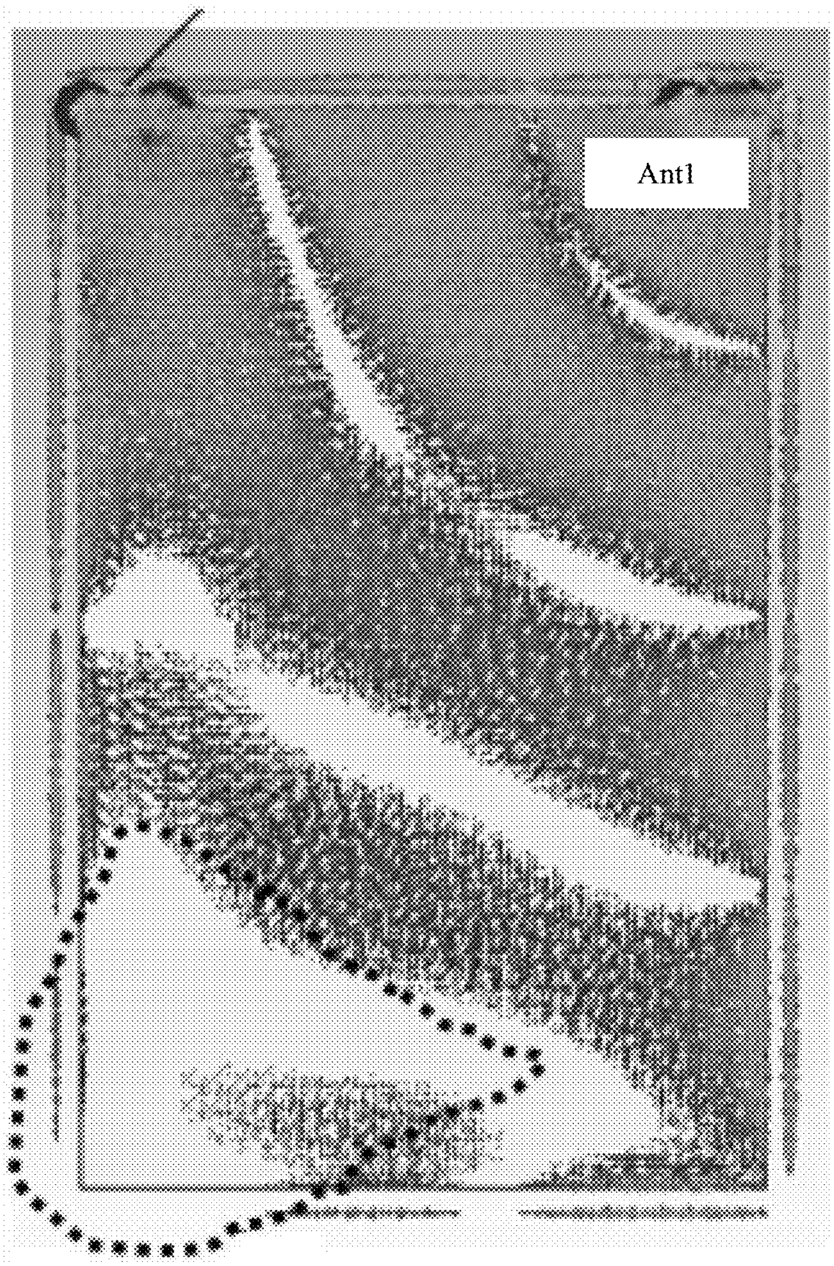
FIG. 6 is a ground plate current distribution diagram of a ground plate of a Wi-Fi and Bluetooth combined antenna apparatus according to an embodiment of this application.

In some other embodiments of this application, as shown in FIG. 5, the perturbation unit 30 includes a radiator 31, a connecting portion 33, and a resistor-capacitor matching network 32. The radiator 31 is connected to the ground plate 20 through the connecting portion 33, and the resistor-capacitor matching network 32 is connected to an open end of the radiator 31 and is used for outputting the reverse current to the ground plate 20.

Specifically, the open end of the radiator 31 face a direction of the ground plate, which enables the resistor-capacitor matching network 32 to better output the reverse current to the ground plate 20. More specifically, the resistor-capacitor matching network 32 is a centralized element including a resistor and a capacitor or further including a switch.

Exemplarily, when the resonant frequencies of the two perturbation units 30 are the same, the resistor-capacitor matching networks 32 have a same equivalent capacitance (for example, both are 0.3 pF). When the resonant frequencies of the two perturbation units 30 are the same, the resistor-capacitor matching networks 32 have different equivalent capacitances (for example, 0.3 pF and 0.35 pF respectively).

Figure 13:
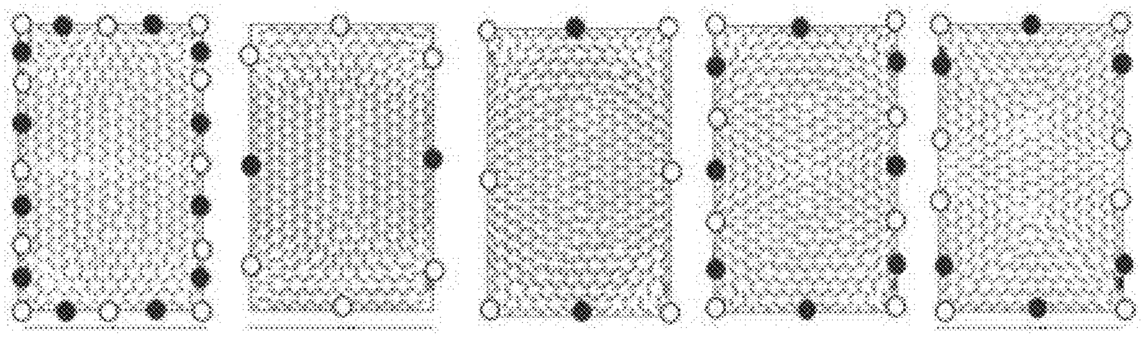
FIG. 13 is a distribution diagram of a characteristic mode current size point of a ground plate of a Wi-Fi and Bluetooth combined antenna apparatus according to an embodiment of this application.
Figure 14:
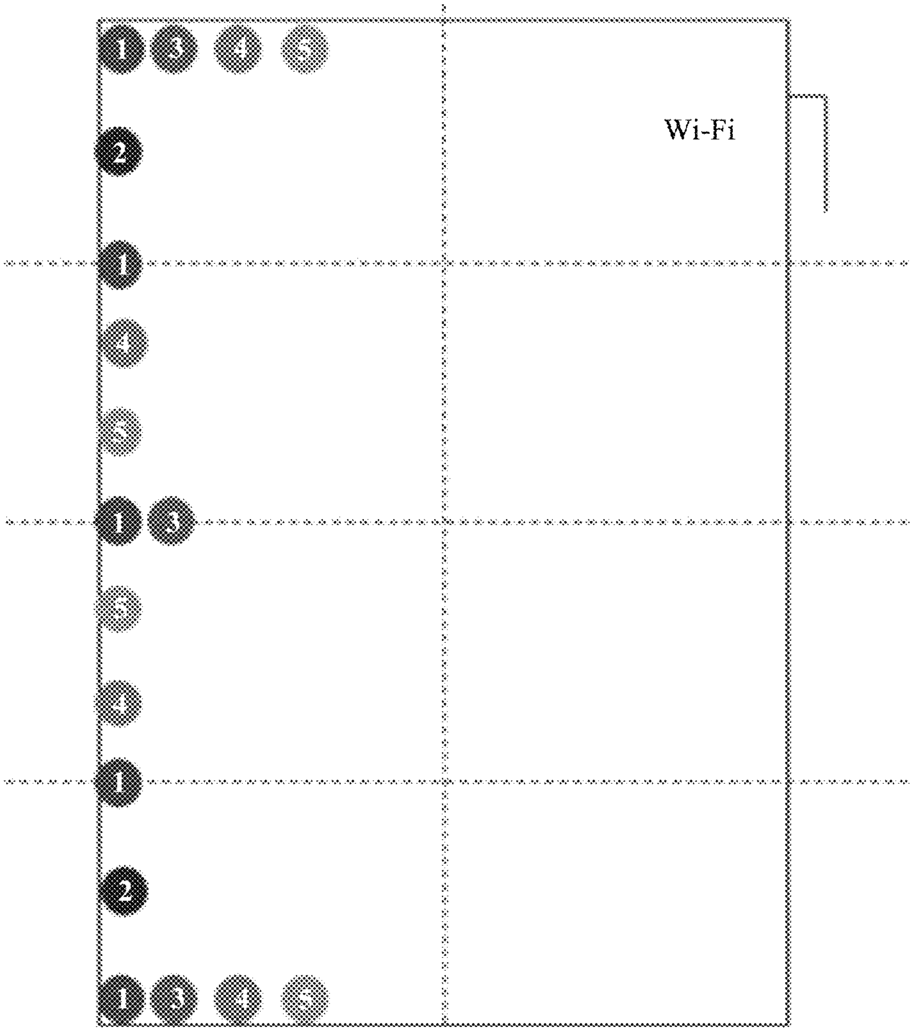
FIG. 14 is a distribution diagram of collection of a characteristic mode current size point of a ground plate of a Wi-Fi and Bluetooth combined antenna apparatus according to an embodiment of this application.

Exemplarily, as shown in FIG. 13 to FIG. 14, when the Wi-Fi antenna 10 is in a different frequency band, a zero point distribution position of the ground plate current at the edge of the ground plate 20 may be marked, collected, and analyzed, to obtain an ideal position for the perturbation unit 30 to be placed at the edge of the ground plate 20.

In some other embodiments of this application, the connecting portion 33 and the radiator 31 are integrally formed. Specifically, by integrally forming the connecting portion 33 and the radiator 31, overall structural strength of the perturbation unit 30 can be improved, so that a connection position between the connecting portion 33 and the radiator 31 is not prone to cracking, which also improves working reliability of the perturbation unit 30.

Exemplarily, the connecting portion 33 and the radiator 31 may be made in a molding manner such as integrated molding.

In some other embodiments of this application, the connecting portion 33 is a metal spring plate, one end of the metal spring plate is welded to the radiator 31, and the other end of the metal spring plate is welded to the ground plate 20. Specifically, by designing the connecting portion 33 as the metal spring plate, the connecting portion 33 also has better elastic buffering performance, so that when the perturbation unit 30 is affected by external shock vibration, the connecting portion 33 can also resolve an impact force on the perturbation unit 30 by elastic deformation, so that the perturbation unit 30 is not easy to be detached from the ground plate 20.

In some other embodiments of this application, a length, a thickness, and a clearance of the radiator 31 satisfy the following relationships:

$$10\text{ mm} \le L \le 18\text{ mm};$$

$$0.8\text{ mm} \le C \le 1.2\text{ mm; and}$$

$$0.8\text{ mm} \le D \le 1.2\text{ mm},$$

where L represents the length of the radiator 31, C represents the thickness of the radiator 31, and D represents the clearance of the radiator 31.

Specifically, by setting the length, the thickness, and the clearance of the radiator 31 within the foregoing limit ranges, the radiator 31 can smoothly generate the reverse current when being excited by the ground plate current, and in addition, when the perturbation unit 30 and a stylus 50 are both on a same side of the ground plate 20, it can be avoided that a placement space of the stylus 50 is occupied.

Figure 15:
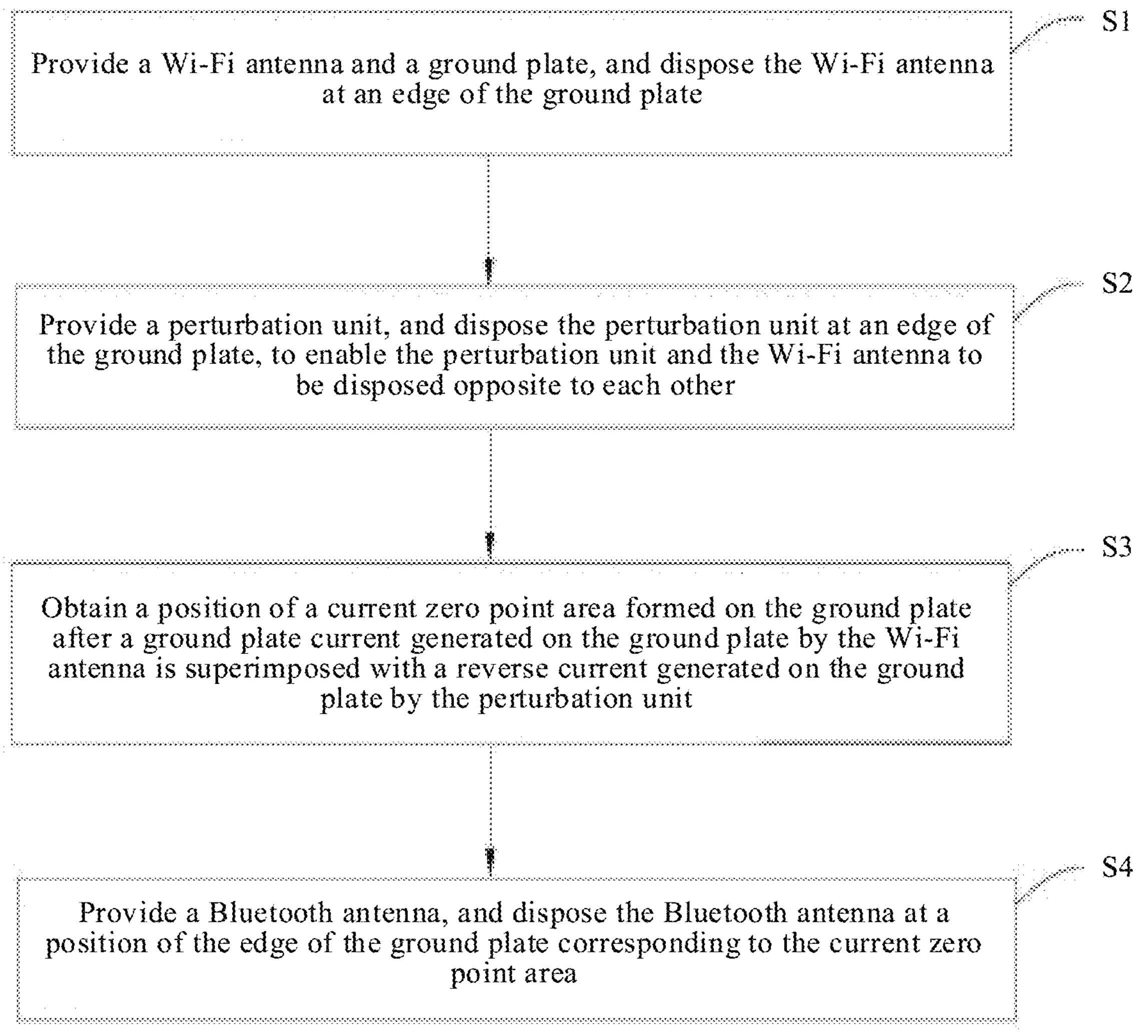
FIG. 15 is a flowchart of steps of a configuration method for a Wi-Fi and Bluetooth combined antenna apparatus according to an embodiment of this application.

As shown in FIG. 15, according to a second aspect, an embodiment of this application further provides a configuration method for a Wi-Fi and Bluetooth combined antenna apparatus, including the following steps:

- providing a Wi-Fi antenna 10 and a ground plate 20, and disposing the Wi-Fi antenna 10 at an edge of the ground plate 20;
- providing a perturbation unit 30, and disposing the perturbation unit 30 at an edge of the ground plate 20, to enable the perturbation unit 30 and the Wi-Fi antenna 10 to be disposed opposite to each other;
- obtaining a position of a current zero point area formed on the ground plate 20 after a ground plate 20 current generated on the ground plate 20 by the Wi-Fi antenna 10 is superimposed with a reverse current generated on the ground plate 20 by the perturbation unit 30; and
- providing a Bluetooth antenna 40, and disposing the Bluetooth antenna 40 at a position of the edge of the ground plate 20 corresponding to the current zero point area.

Specifically, an order of the steps of the configuration method for the Wi-Fi and Bluetooth combined antenna apparatus may be as follows.

S1: Provide the Wi-Fi antenna 10 and the ground plate 20, and dispose the Wi-Fi antenna 10 at the edge of the ground plate 20.

S2: Provide the perturbation unit 30, and dispose the perturbation unit 30 at the edge of the ground plate 20, to enable the perturbation unit 30 and the Wi-Fi antenna 10 to be disposed opposite to each other.

S3: Obtain the position of the current zero point area formed on the ground plate 20 after the ground plate 20 current generated on the ground plate 20 by the Wi-Fi antenna 10 is superimposed with the reverse current generated on the ground plate 20 by the perturbation unit 30.

S4: Provide the Bluetooth antenna 40, and dispose the Bluetooth antenna 40 at the position of the edge of the ground plate 20 corresponding to the current zero point area.

According to the configuration method for the Wi-Fi and Bluetooth combined antenna apparatus provided in this embodiment of this application, the perturbation unit 30 is disposed at the edge of the ground plate 20, and the perturbation unit 30 and the Wi-Fi antenna 10 are enabled to be disposed opposite to each other, so that when the Wi-Fi antenna 10 generates the ground plate current on the ground plate 20, the perturbation unit 30 can generate the reverse current whose direction is opposite to an incoming wave direction of the ground plate current after being excited by the ground plate current, so that the reverse current is superimposed with the ground plate current and the current zero point area can be formed on the ground plate, and then the Bluetooth antenna 40 is disposed at the position of the edge of the ground plate 20 corresponding to the current zero point area, which better reduces an impact of the ground plate current on the Bluetooth antenna 40, better improves isolation between the Bluetooth antenna 40 and the Wi-Fi antenna 10, and better implements decoupling when the Bluetooth antenna 40 and the Wi-Fi antenna 10 simultaneously work in a same working frequency band, so that the Bluetooth antenna 40 and the Wi-Fi antenna 10 have better working performance when simultaneously working in a same frequency band.

According to a third aspect, an embodiment of this application provides a terminal device, including the foregoing Wi-Fi and Bluetooth combined antenna apparatus. The terminal device may be a tablet computer, a notebook computer, a mobile phone, or the like.

The terminal device provided in this embodiment of this application includes the foregoing Wi-Fi and Bluetooth combined antenna apparatus, and the foregoing Wi-Fi and Bluetooth combined antenna apparatus implements, through a perturbation unit 30 disposed therein, decoupling when a Bluetooth antenna 40 and a Wi-Fi antenna 10 simultaneously work in a same working frequency band, so that the Bluetooth antenna 40 and the Wi-Fi antenna 10 have better isolation and can have better working performance when simultaneously working in a same frequency band. In this way, when the terminal device is connected to a Wi-Fi network and is simultaneously connected to an external device such as a stylus 50 by using the Bluetooth antenna 40, that the Bluetooth antenna 40 and the Wi-Fi antenna 10 do not affect each other can also be satisfied, so that a user of the terminal device has better user product experience.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A Wi-Fi and Bluetooth combined antenna apparatus, comprising:

a Wi-Fi antenna;

a ground plate, wherein the Wi-Fi antenna is disposed at an edge of the ground plate and can generate a ground plate current on the ground plate;

a perturbation unit comprising at least a radiator and a connecting portion, wherein the radiator is connected to the ground plate through the connecting portion, and wherein the Wi-Fi antenna and the perturbation unit are respectively disposed at two opposite corner positions of the ground plate, the perturbation unit is disposed at an edge of the ground plate and is configured to generate a reverse current whose direction is opposite to an incoming wave direction of the ground plate current after being excited by the ground plate current, and a current zero point area is formed on the ground plate after the reverse current is superimposed with the ground plate current; and a Bluetooth antenna, wherein the Bluetooth antenna is disposed at a position of the edge of the ground plate corresponding to the current zero point area.

2. The Wi-Fi and Bluetooth combined antenna apparatus according to claim 1, wherein there are two perturbation units, the two perturbation units are disposed diagonally at two corner positions of the ground plate relative to a center of the ground plate, and the Wi-Fi antenna is disposed at another corner position of the ground plate.

3. The Wi-Fi and Bluetooth combined antenna apparatus according to claim 1, wherein resonant frequencies of two perturbation units are the same.

4. The Wi-Fi and Bluetooth combined antenna apparatus according to claim 1, wherein resonant frequencies of two perturbation units are different, and a difference between the resonant frequencies of the two perturbation units is greater than 0 MHz and less than or equal to 100 MHz.

5. The Wi-Fi and Bluetooth combined antenna apparatus according to claim 1, wherein the perturbation unit further comprises a resistor-capacitor matching network, wherein the resistor-capacitor matching network is connected to an open end of the radiator and is configured to output the reverse current to the ground plate.

6. The Wi-Fi and Bluetooth combined antenna apparatus according to claim 1, wherein the connecting portion and the radiator are integrally formed; or the connecting portion is a metal spring plate, one end of the metal spring plate is welded to the radiator, and the other end of the metal spring plate is welded to the ground plate.

7. The Wi-Fi and Bluetooth combined antenna apparatus according to claim 1, wherein a length, a thickness, and a clearance of the radiator satisfy the following relationships:

$$10\text{ mm} \le L \le 18\text{ mm};$$

$$0.8\text{ mm} \le C \le 1.2\text{ mm}; \text{ and}$$

$$0.8\text{ mm} \le D \le 1.2\text{ mm},$$

wherein L represents the length of the radiator, C represents the thickness of the radiator, and D represents the clearance of the radiator.

8. A configuration method for a Wi-Fi and Bluetooth combined antenna apparatus, comprising:

providing a Wi-Fi antenna and a ground plate and disposing the Wi-Fi antenna at an edge of the ground plate;

providing a perturbation unit, and disposing the perturbation unit at an edge of the ground plate, to enable the perturbation unit and the Wi-Fi antenna to be disposed opposite to each other, wherein the perturbation unit comprises at least a radiator and a connecting portion, wherein the radiator is connected to the ground plate through the connecting portion, and wherein the Wi-Fi antenna and the perturbation unit are respectively disposed at two opposite corner positions of the ground plate, the perturbation unit is configured to generate a reverse current having a direction that is opposite to an incoming wave direction of a ground plate current after being excited by the ground plate current;

obtaining a position of a current zero point area formed on the ground plate after the ground plate current generated on the ground plate by the Wi-Fi antenna is superimposed with a reverse current generated on the ground plate by the perturbation unit; and providing a Bluetooth antenna and disposing the Bluetooth antenna at a position of the edge of the ground plate corresponding to the current zero point area.

9. A terminal device, comprising:

a Wi-Fi and Bluetooth combined antenna apparatus, comprising:

a Wi-Fi antenna;

a ground plate, wherein the Wi-Fi antenna is disposed at an edge of the ground plate and can generate a ground plate current on the ground plate;

a perturbation unit comprising at least a radiator and a connecting portion, wherein the radiator is connected to the ground plate through the connecting portion, and wherein the Wi-Fi antenna and the perturbation unit are respectively disposed at two opposite corner positions of the ground plate, the perturbation unit is disposed at an edge of the ground plate and is configured to generate a reverse current whose direction is opposite to an incoming wave direction of the ground plate current after being excited by the ground plate current, and a current zero point area is formed on the ground plate after the reverse current is superimposed with the ground plate current; and a Bluetooth antenna, wherein the Bluetooth antenna is disposed at a position of the edge of the ground plate corresponding to the current zero point area.

10. The terminal device according to claim 9, wherein there are two perturbation units, the two perturbation units are disposed diagonally at two corner positions of the ground plate relative to a center of the ground plate, and the Wi-Fi antenna is disposed at another corner position of the ground plate.

11. The terminal device according to claim 9, wherein resonant frequencies of two perturbation units are the same.

12. The terminal device according to claim 9, wherein resonant frequencies of two perturbation units are different, and a difference between the resonant frequencies of the two perturbation units is greater than 0 MHz and less than or equal to 100 MHz.

13. The terminal device according to claim 9, wherein the perturbation unit further comprises a resistor-capacitor matching network, wherein the resistor-capacitor matching network is connected to an open end of the radiator and is configured to output the reverse current to the ground plate.

14. The terminal device according to claim 9, wherein the connecting portion and the radiator are integrally formed; or the connecting portion is a metal spring plate, one end of the metal spring plate is welded to the radiator, and the other end of the metal spring plate is welded to the ground plate.

15. The terminal device according to claim 9, wherein a length, a thickness, and a clearance of the radiator satisfy the following relationships:

$$10\ \text{mm} \le L \le 18\ \text{mm};$$

$$0.8\ \text{mm} \le C \le 1.2\ \text{mm};\ \text{and}$$

$$0.8\ \text{mm} \le D \le 1.2\ \text{mm},$$

wherein L represents the length of the radiator, C represents the thickness of the radiator, and D represents the clearance of the radiator.

16. The configuration method according to claim 8, further comprising providing a second perturbation unit to form two perturbation units, the two perturbation units are disposed diagonally at two corner positions of the ground plate relative to a center of the ground plate, and the Wi-Fi antenna is disposed at another corner position of the ground plate.

17. The configuration method according to claim 16, wherein resonant frequencies of two perturbation units are the same.

18. The configuration method according to claim 16, wherein resonant frequencies of two perturbation units are different, and a difference between the resonant frequencies of the two perturbation units is greater than 0 MHz and less than or equal to 100 MHz.

19. The configuration method according to claim 8, wherein the perturbation unit further comprises a resistor-capacitor matching network, wherein the resistor-capacitor matching network is connected to an open end of the radiator and is configured to output the reverse current to the ground plate.

* * * * *